Nov. 6, 1945.   H. A. McKEE   2,388,491
FRICTION DRIVE
Filed May 4, 1944.   2 Sheets-Sheet 1
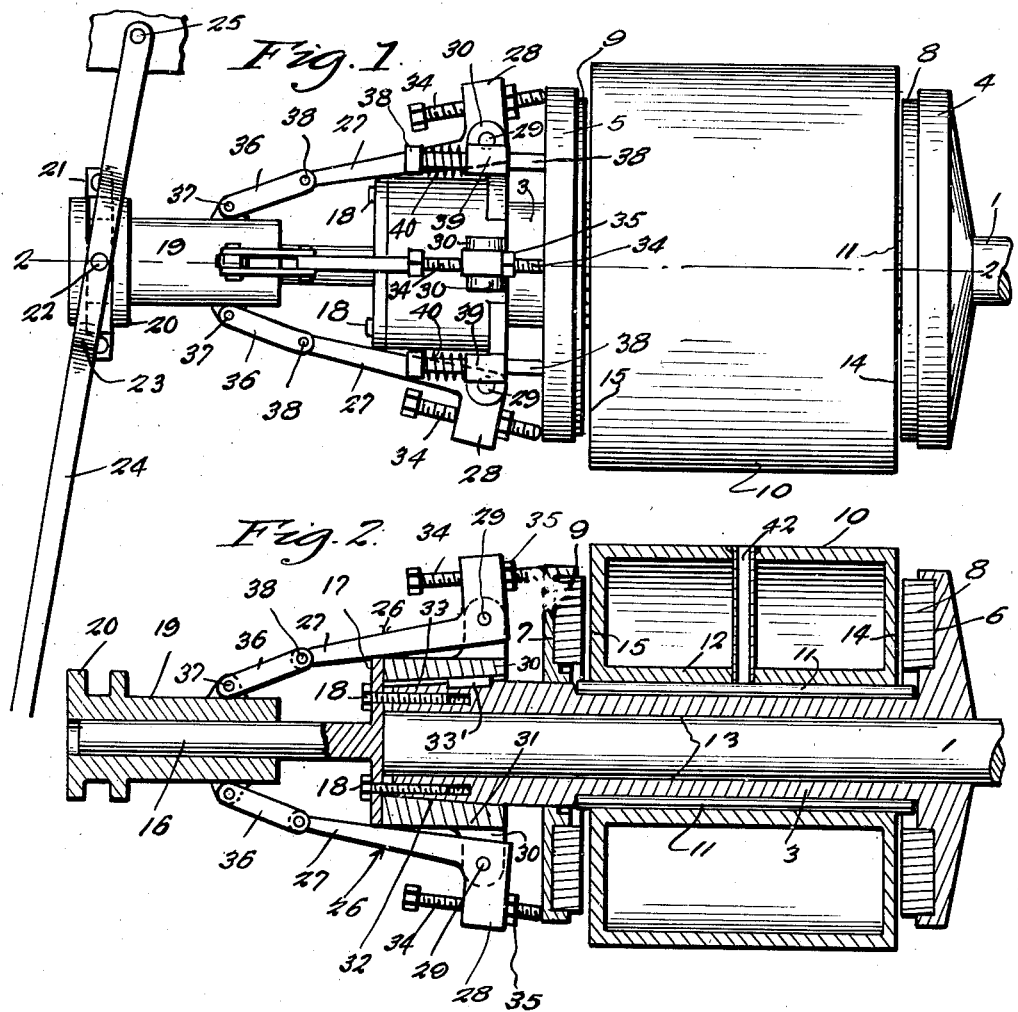
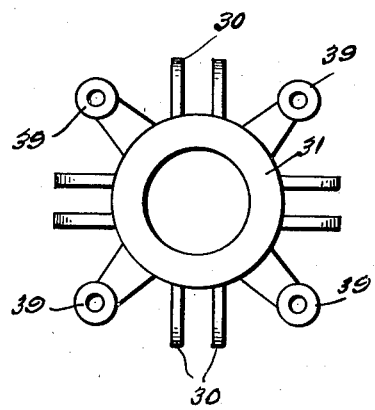
Inventor
Harry Albert McKee
By Clarence A. O'Brien
and Harvey B. Jackson
Attorneys Nov. 6, 1945.   H. A. McKEE   2,388,491
FRICTION DRIVE
Filed May 4, 1944   2 Sheets-Sheet 2
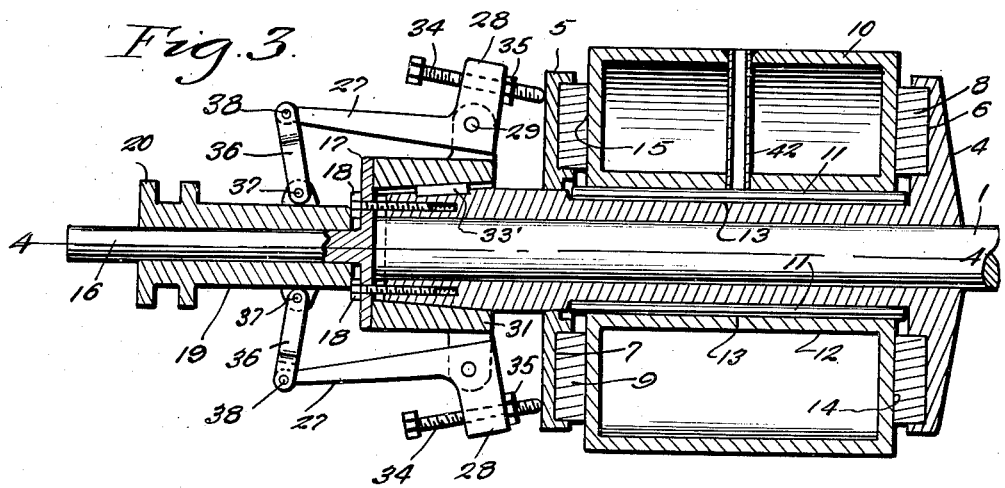
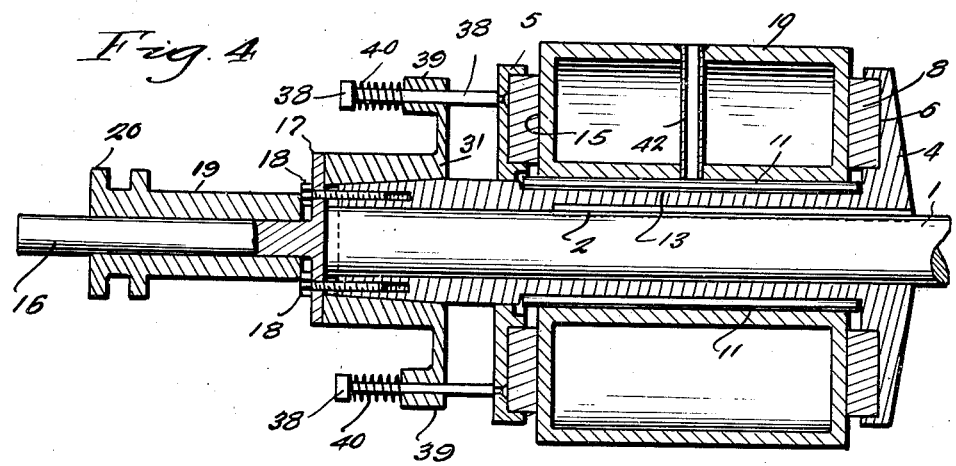
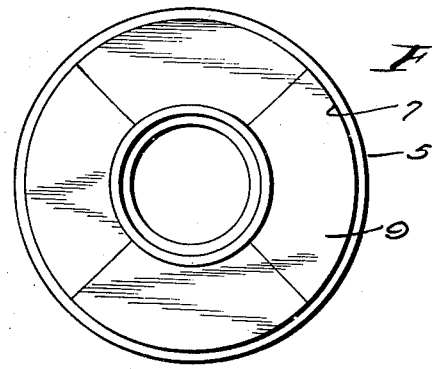
Inventor
Harry Albert McKee Patented Nov. 6, 1945

2,388,491

UNITED STATES PATENT OFFICE 2,388,491

FRICTION DRIVE

Harry Albert McKee, Washington, Pa.

Application May 4, 1944, Serial No. 534,141

1 Claim. (Cl. 192—68)

My invention relates to improvements in friction drives for use, especially, although not necessarily, on the crank shafts of internal combustion engines to drive oil well pumping equipment, and the like.

As explanatory, in driving the pump of an oil well by an internal combustion engine, the engine must be started first and then operatively connected to the pump, since the load of the pump on the engine renders starting the engine undesirable, particularly when the engine must be started by hand, for reasons which will be obvious.

Having the foregoing in mind, it is the primary object of my invention to equip the crank shafts of such engines with a friction clutch, belt pulley, in the case of belt drives, between the engine and pump, which will withstand prolonged use without breaking down or developing defects, is simple in construction, involves few parts, is adequately equipped with anti-friction bearings, adjustable quickly and easily to vary the frictional engagement of parts so as to prevent grabbing, and is easy to install and inexpensive to manufacture and service.

Other, and subordinate, objects are also comprehended by my invention, all of which, together with the precise nature of my improvements, will be readily understood when the succeeding description and claims are read with reference to the drawings accompanying and forming part of this specification.

In said drawings:

Figure 1 is a view in plan illustrating my improved friction drive in its preferred embodiment, Figure 2 is a view in longitudinal section taken on the line 2—2 of Figure 1, and showing the clutch disengaged, Figure 3 is a similar view showing the clutch engaged, Figure 4 is a view in longitudinal section taken on the line 4—4 of Figure 3, Figure 5 is a view in elevation of one of the clutch discs, Figure 6 is a view in elevation of the collar.

Referring to the drawings by numerals, according to my invention, as illustrated, the crank shaft 1 of an internal combustion engine, not shown, has keyed thereto, on the rear end portion thereof, and as shown in Figure 4, at 2, a driven, tubular sleeve 3 of suitable length provided on what constitutes the front end thereof with a clutch disc 4 preferably forming an integral part of the sleeve. Adjacent the rear end of said sleeve 3, which terminates adjacent the rear end of the shaft 1, a second clutch disc 5 is movably mounted on said sleeve 3 for lateral shifting and rotation thereon. The relatively fixed and movable clutch discs 4, 5 are provided in opposed faces thereof with annular, flat-bottomed recesses, 6, 7. Annular, flat-sided clutch facings 8, 9, preferably formed of wood, and in quarter sections, are fitted in said recesses 6, 7, respectively, to project out of the same.

A hollow, straight-sided belt pulley 10 is rotatably and slidably mounted on the sleeve 3 between the clutch discs 4, 5 on roller bearings 11 of a length corresponding, at least, to the width of the hub 12 of said pulley, and which are suitably seated in longitudinal grooves 13 provided in the outer circumference of the sleeve 3. As will be seen, the straight sides of the pulley 10 provide side clutch faces 14, 15 thereof opposed to the clutch facings 8, 9, respectively, and the pulley 10 is designed to be clutched to the driven sleeves 3 by shifting the movable clutch disc 5 laterally toward the clutch face 14 of said pulley to thereby frictionally grip the clutch faces 14, 15 between the facings 8, 9. Conversely, the pulley 10 is designed to be released from said sleeve 3 by lateral shifting of said clutch disc 5 away from the clutch face 15 of the pulley 10.

Means for shifting the movable clutch disc 5 are provided as follows. A reduced extension spindle 16, of suitable length and axially aligned with the rear end of the crank shaft 1, is secured to the rear end of the driven sleeve 3 by means of an end flange 17 on said spindle, and cap screws 18 threaded through said flange into said end of the sleeve.

A clutch control sleeve 19 is fitted on said spindle 16 for endwise sliding movement thereon in opposite directions, respectively, and which comprises a circumferentially grooved end 20 for receiving the usual collar 21 mounted by pivot studs 22 in a yoke section 23 of the usual type of clutch-shifting lever 24 suitably pivoted at one end, as at 25. The clutch control sleeve 19 is operatively connected, as presently described, to a plurality of clutch shifting levers 26 of right angle form provided with long lever arms 27 and short lever arms 28 and which are pivoted at the juncture of said arms, by pivot pins 29, between pairs of external ears 30 on a collar 31 on the driven sleeve 3, the arrangement being such that the levers 26 are grouped around the collar 31 in equidistantly spaced relation and with the long lever arms 27 extending lengthwise of the axis of the collar beyond the rear end of the crank shaft 1 in surrounding relation to the clutch control sleeve 19, whereas the short lever arms 28 extend laterally from said collar 31. The collar 31 is internally tapered, as at 32, and fitted on a correspondingly tapered rear end section 33 of the driven sleeve 3 with correspondingly inclined key connection, as at 33', between the collar and section, the arrangement providing for a drive fit of said collar on said section 33. The before mentioned flange 17 of the spindle 16 is opposed to the collar 31 to prevent the same from working off the section 33. Cap screws 34 extended through the short lever arms 28 of the levers 26 are provided for engagement with the movable clutch disc 5 and are equipped with lock nuts thereon, as at 35.

Links 36 pivoted at one end, as at 37, on the clutch control sleeve 19 and having the other ends thereof pivoted, as at 38, to the free ends of the long lever arms 27 operatively connect said sleeve to the clutch-engaging and disengaging levers 26 so that when the clutch control sleeve 19 is shifted in one direction, i. e., to the right as viewed in Figure 1, the clutch-engaging and disengaging levers 26 will be swung in a direction to thrust the cap screws 34 against the movable clutch disc 5 and shift said disc laterally against the clutch face 15 of the pulley 10 and thereby clamp the clutch faces 14, 15 of said pulley between the clutch facings 8, 9 of the clutch discs 4, 5. Obviously, under shifting of said clutch control sleeve 19 in the opposite direction, said levers 26 will be swung in the opposite direction to retract the cap screws 34 and permit the movable clutch disc 5 to be moved away from the clutch face 15 to release the pulley 10 for idling around the driven sleeve 3.

Spring tensioned guide pins 38 provide for retracting the movable clutch disc 5 and its facing 9 and are slidably mounted in radial bearings 39 on the collar 31 intermediate the pairs of ears 30 with one end fixed in the movable clutch disc 5, as shown in Figure 4. Coil springs 40 on said pins 38, between the bearings 39 and heads on the other ends of said pins urge the pins in a direction to normally retract the movable clutch disc 5 and its facings 9 as soon as the screws 34 release said disc.

A suitable lubricating fitting, for instance the tube 42, is extended radially into the pulley 10 to lubricate the roller bearings 11.

The foregoing will, it is believed, suffice to impart a clear understanding of my invention without further explanation, since the operation has been set forth in connection with the description of parts.

Manifestly, the invention, as described, is susceptible of modification without departing from the inventive concept, and right is herein reserved to such modifications as fall within the scope of the appended claim.

What I claim is:

In combination, a driving shaft, a driven sleeve keyed on the shaft, a clutch disc fixed on one end of the sleeve, a clutch disc on the sleeve intermediate its ends shiftable toward the fixed clutch disc, a pulley rotatable on said sleeve and adapted to be gripped between said clutch discs when the shiftable clutch disc is shifted toward the fixed disc, and means for shifting the shiftable clutch disc comprising a collar wedged on the other end of the sleeve, a spindle extending axially from said other end of the sleeve and having an end flange bolted to said other end of the sleeve and bearing against the collar to retain the same on said sleeve, a shiftable sleeve on said spindle, a plurality of screw-carrying levers pivoted on said collar for operation to thrust said screws against the shiftable clutch disc, and operating connections between the shiftable sleeve and said levers.

HARRY ALBERT McKEE.